(12) United States Patent
Ding et al.

(10) Patent No.: US 10,690,539 B2
(45) Date of Patent: Jun. 23, 2020

(54) CIRCUIT AND METHOD FOR DETECTING AMBIENT LIGHT, AND DISPLAY PANEL

(71) Applicant: BOE TECHNOLOGY GROUP CO., LTD., Beijing (CN)

(72) Inventors: Xiaoliang Ding, Beijing (CN); Xue Dong, Beijing (CN); Jing Lv, Beijing (CN); Haisheng Wang, Beijing (CN); Chunwei Wu, Beijing (CN); Yingming Liu, Beijing (CN); Pengpeng Wang, Beijing (CN); Wei Liu, Beijing (CN); Yanling Han, Beijing (CN); Xueyou Cao, Beijing (CN); Ping Zhang, Beijing (CN)

(73) Assignee: BOE TECHNOLOGY GROUP., LTD., Beijing (CN)

( * ) Notice: Subject to any disclaimer, the term of this patent is extended or adjusted under 35 U.S.C. 154(b) by 0 days.

(21) Appl. No.: 16/094,796

(22) PCT Filed: Feb. 12, 2018

(86) PCT No.: PCT/CN2018/076472
§ 371 (c)(1),
(2) Date: Oct. 18, 2018

(87) PCT Pub. No.: WO2018/171364
PCT Pub. Date: Sep. 27, 2018

(65) Prior Publication Data
US 2019/0120687 A1 Apr. 25, 2019

(30) Foreign Application Priority Data

Mar. 20, 2017 (CN) .......................... 2017 1 0165386

(51) Int. Cl.
*G01J 1/42* (2006.01)
*G01J 1/46* (2006.01)
(Continued)

(52) U.S. Cl.
CPC ............... *G01J 1/4204* (2013.01); *G01J 1/46* (2013.01); *G09G 5/10* (2013.01)

(58) Field of Classification Search
CPC combination set(s) only.
See application file for complete search history.

(56) References Cited

U.S. PATENT DOCUMENTS 9,155,155 B1 * 10/2015 Ho ..................... H05B 33/0869
9,332,598 B1 * 5/2016 Ho ..................... H05B 33/0869
(Continued)

FOREIGN PATENT DOCUMENTS

CN 1991591 A 7/2007
CN 104568146 A 4/2015
(Continued)

OTHER PUBLICATIONS

First Chinese Office Action dated Dec. 21, 2017, received for corresponding Chinese Application No. 201710165386.5.
(Continued)

*Primary Examiner* — Wesner Sajous
(74) *Attorney, Agent, or Firm* — Kinney & Lange, P.A.

(57) ABSTRACT

The present application proposes a circuit and method for detecting ambient light, and a display panel. The circuit for detecting ambient light includes a light sensing sub-circuit configured to output a voltage pulse signal related to present intensity of the ambient light; and a detection sub-circuit electrically connected to the light sensing sub-circuit, and configured to acquire a frequency of the voltage pulse signal, and obtain the present intensity of the ambient light according to the frequency of the voltage pulse signal.

11 Claims, 5 Drawing Sheets

(51) Int. Cl.
*G09G 5/10* (2006.01)
*H04N 1/60* (2006.01)
*H04N 5/58* (2006.01)
*H04N 9/77* (2006.01)

(56) References Cited

U.S. PATENT DOCUMENTS

| | | | |
|---|---|---|---|
| 9,345,097 B1* | 5/2016 | Ho | H05B 33/0818 |
| 2013/0002143 A1* | 1/2013 | Panaccio | H05B 33/0851 |
| | | | 315/152 |
| 2013/0187027 A1* | 7/2013 | Qiao | H04N 5/2351 |
| | | | 250/208.1 |

FOREIGN PATENT DOCUMENTS

| | | |
|---|---|---|
| CN | 105405429 A | 3/2016 |
| CN | 106969832 A | 7/2017 |
| JP | 2003324028 A | 11/2003 |

OTHER PUBLICATIONS

International Search Report and English Translation of Box V of the Written Opinion dated May 7, 2018, received for corresponding Chinese Application No. PCT/CN2018/076472.

* cited by examiner

CIRCUIT AND METHOD FOR DETECTING AMBIENT LIGHT, AND DISPLAY PANEL

CROSS-REFERENCE TO RELATED APPLICATION(S)

This application claims priority to the Chinese Patent Application No. 201710165386.5, filed on Mar. 20, 2017, which is incorporated herein by reference in its entirety.

TECHNICAL FIELD

The present disclosure relates to the field of display technologies, and more particularly, to a circuit for detecting ambient light, a display panel, and a method for detecting ambient light.

BACKGROUND

With the increasing popularity of terminal devices (for example, mobile phones, readers, tablets, etc.), users' requirements for performance of the terminal devices are increasing. Here, an important index for evaluating the performance of the terminal devices is power consumption, and a large part of the power consumption of the terminal devices results from display panels.

In order to reduce power consumption of a display panel, ambient light may be detected. Brightness of the display panel is automatically increased when it is detected that the ambient light has high intensity, and the brightness of the display panel is automatically decreased when it is detected that the ambient light has low intensity. In this way, not only the users' use requirements can be met and the users' comfort can be enhanced, but also energy-saving purposes can be achieved. How to effectively detect the brightness of the ambient light is critical to the brightness adjustment of the display panel.

SUMMARY

Some embodiments of the present disclosure propose a circuit for detecting ambient light, comprising: a light sensing sub-circuit configured to output a voltage pulse signal related to present intensity of the ambient light; and a detection sub-circuit electrically connected to the light sensing sub-circuit, and configured to acquire a frequency of the voltage pulse signal, and obtain the present intensity of the ambient light according to the frequency of the voltage pulse signal.

According to some embodiments of the present disclosure, the light sensing sub-circuit comprises: a first optical sensor having one terminal electrically connected to a first power source; a first transistor having a first electrode electrically connected to the other terminal of the first optical sensor; a second transistor having a first electrode electrically connected to the first power source, a control electrode electrically connected to the first electrode of the first transistor, and a second electrode electrically connected to an output terminal of the light sensing sub-circuit; a first capacitor and a second capacitor, wherein one terminal of the first capacitor is electrically connected to the control electrode of the second transistor, one terminal of the second capacitor is electrically connected to the second electrode of the second transistor, and the other terminal of the first capacitor, the other terminal of the second capacitor and a second electrode of the first transistor are electrically connected to a second power source, respectively; and a second optical sensor having one terminal electrically connected to the second electrode of the second transistor, said one terminal of the second capacitor, and a control electrode of the first transistor respectively, and the other terminal electrically connected to the second power source.

According to some embodiments of the present disclosure, the first optical sensor comprises a first light-sensitive diode, and the second optical sensor comprises a second light-sensitive diode. The first light-sensitive diode has a cathode electrically connected to the first power source, and an anode electrically connected to the first electrode of the first transistor, the second light-sensitive diode has a cathode electrically connected to the second electrode of the second transistor, said one terminal of the second capacitor, and the control electrode of the first transistor respectively, and an anode connected to the second power source, and both the first light-sensitive diode and the second light-sensitive diode operate in a reverse bias state.

According to some embodiments of the present disclosure, a voltage of the first power source is greater than a threshold voltage of the first transistor and greater than a threshold voltage of the second transistor, and a voltage of the second power source is less than the threshold voltage of the first transistor and less than the threshold voltage of the second transistor.

According to some embodiments of the present disclosure, the detection sub-circuit comprises: a rectification unit electrically connected to the light sensing sub-circuit, and configured to rectify the voltage pulse signal to obtain a pulse wave having the same frequency and the same phase as those of the voltage pulse signal; and a frequency acquisition unit electrically connected to the rectification unit, and configured to acquire the frequency of the pulse wave, and determine the frequency of the voltage pulse signal according to the frequency of the pulse wave.

According to some embodiments of the present disclosure, the rectification unit comprises a trigger, and the frequency acquisition unit comprises a frequency discriminator.

According to some embodiments of the present disclosure, the first transistor and the second transistor are both N-type transistors.

Some embodiments of the present disclosure propose a display panel, comprising the circuit described above.

Some embodiments of the present disclosure propose a method for detecting ambient light, comprising steps of: outputting a voltage pulse signal related to present intensity of the ambient light; and acquiring a frequency of the voltage pulse signal, and obtaining the present intensity of the ambient light according to the frequency of the voltage pulse signal.

According to some embodiments of the present disclosure, the step of acquiring the frequency of the voltage pulse signal comprises: rectifying the voltage pulse signal to obtain a pulse wave having the same frequency and the same phase as those of the voltage pulse signal; and acquiring the frequency of the pulse wave, and determining the frequency of the voltage pulse signal according to the frequency of the pulse wave.

DETAILED DESCRIPTION

The embodiments of the present disclosure will be described in detail below, and examples of the embodiments are illustrated in the accompanying drawings, wherein the same or similar reference signs are used to refer to the same or similar elements or elements having the same or similar functions. The embodiments described below with reference to the accompanying drawings are intended to be illustrative and are used to explain the present disclosure, but should not be construed as limiting the present disclosure.

An circuit for detecting ambient light, a display panel, and a method for detecting ambient light according to the embodiments of the present disclosure will be described below with reference to the accompanying drawings.

Figure 1:
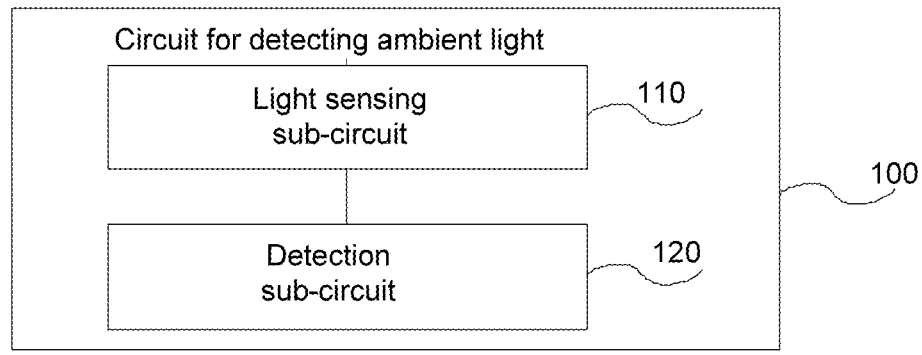
FIG. 1 is a block diagram of a circuit for detecting ambient light according to an embodiment of the present disclosure.

FIG. 1 is a block diagram of a circuit for detecting ambient light according to an embodiment of the present disclosure. As shown in FIG. 1, the circuit 100 for detecting ambient light comprises a light sensing sub-circuit 110 and a detection sub-circuit 120.

Here, the light sensing sub-circuit 110 outputs a voltage pulse signal related to present intensity of the ambient light by sensing the present intensity of the ambient light. The detection sub-circuit 120 is electrically connected to the light sensing sub-circuit 110, and is configured to acquire a frequency of the voltage pulse signal, and obtain the present intensity of the ambient light according to the frequency of the voltage pulse signal.

Specifically, in the embodiments of the present disclosure, the light sensing sub-circuit 110 may be an oscillation circuit comprising elements, for example, a light sensing element, a switching device, and a capacitor etc., wherein the light sensing element is configured to sense the present intensity of the ambient light in real time to generate photocurrent, the switching device is configured to realize turn-on and turn-off of the circuit, and the capacitor is configured to store energy. The oscillation circuit outputs a signal related to the intensity of the ambient light, for example, the voltage pulse signal, under the cooperation of the light sensing element, the switching device and the capacitor etc. Then, the detection sub-circuit 120 acquires a frequency of the voltage pulse signal, and acquires the present intensity of the ambient light according to the frequency of the voltage pulse signal, thereby realizing effective detection of the present intensity of the ambient light. Further, since a parameter to be detected is the frequency, advantages such as strong anti-interference ability and high detection accuracy are realized.

Further, in order to make those skilled in the art more aware of how the present disclosure is implemented, a circuit structure of the light sensing sub-circuit 110 will be described in detail below in conjunction with specific examples of the present disclosure.

It can be understood that the embodiments of the present disclosure are described by taking transistors being N-type transistors as an example, in which case, a first power source provides a high level signal, and a second power source provides a low level signal.

Figure 2:
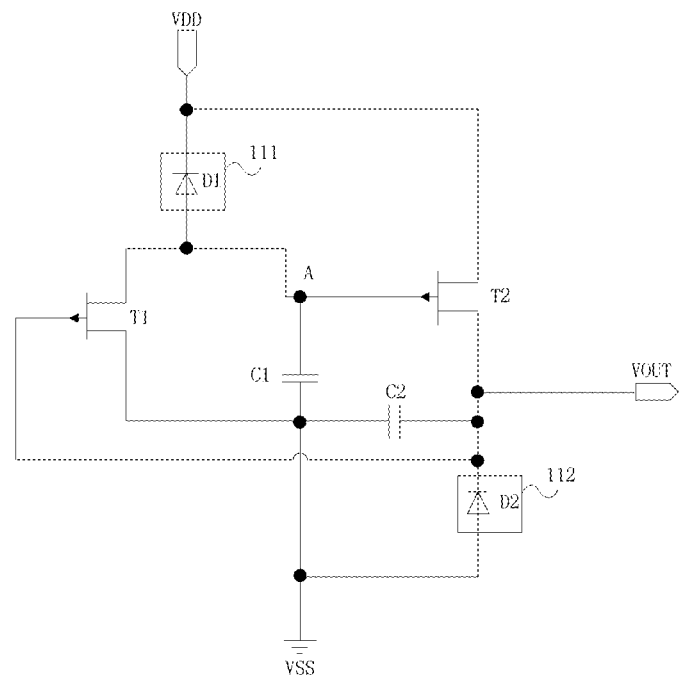
FIG. 2 is a circuit structural diagram of a light sensing sub-circuit according to some embodiments of the present disclosure.

According to some embodiments of the present disclosure, as shown in FIG. 2, the light sensing sub-circuit 110 may comprise a first optical sensor 111, a first transistor T1, a second transistor T2, a first capacitor C1, a second capacitor C2, and a second optical sensor 112. Here, one terminal of the first optical sensor 111 is electrically connected to a first power source VDD; a first electrode of the first transistor T1 is electrically connected to the other terminal of the first optical sensor 111; the second transistor T2 has a first electrode electrically connected to the first power source VDD, a control electrode electrically connected to the first electrode of the first transistor T1, and a second electrode electrically connected to an output terminal VOUT of the light sensing sub-circuit 110; one terminal of the first capacitor C1 is electrically connected to the control electrode of the second transistor T2, one terminal of the second capacitor C2 is electrically connected to the second electrode of the second transistor T2, the other terminal of the first capacitor C1, the other terminal of the second capacitor C2 and a second electrode of the first transistor T1 are electrically connected to a second power source VSS, respectively; and the second optical sensor 112 has one terminal electrically connected to the second electrode of the second transistor T2, said one terminal of the second capacitor C2, and a control electrode of the first transistor T1 respectively, and the other terminal connected to the second power source VSS.

Here, a voltage of the first power source VDD is greater than a threshold voltage of the first transistor T1 and greater than a threshold voltage of the second transistor T2, and a voltage of the second power source VSS is less than the threshold voltage of the first transistor T1 and less than the threshold voltage of the second transistor T2. For example, the voltage of the first power source VDD is a high level voltage having a value greater than the threshold voltage Vth1 of the first transistor T1 and the threshold voltage Vth2 of the second transistor T2, and the voltage of the second power source VSS is a low level voltage having a value less than the threshold voltage Vth1 of the first transistor T1 and the threshold voltage Vth2 of the second transistor T2.

In some embodiments of the present disclosure, the first optical sensor 111 comprises a first light-sensitive diode D1 and the second optical sensor 112 comprises a second light-sensitive diode D2. The first light-sensitive diode D1 has a cathode electrically connected to the first power source VDD, and an anode electrically connected to the first electrode of the first transistor T1, and the second light-sensitive diode D2 has a cathode electrically connected to the second electrode of the second transistor T2, said one terminal of the second capacitor C2 and the control electrode of the first transistor T1 respectively, and an anode connected to the second power source VSS. The first light-sensitive diode D1 and the second light-sensitive diode D2 both operate in a reverse bias state. That is, under the action of the ambient light, the first light-sensitive diode D1 and the second light-sensitive diode D2 may be in a reverse bias state, i.e., a turn-off state, and the first light-sensitive diode D1 and the second light-sensitive diode D2 generate photocurrent.

Here, when the second transistor T2 is turned on, a voltage at the output terminal VOUT of the light sensing sub-circuit 110 gradually increases, and the light sensing sub-circuit 110 outputs a first voltage pulse signal; when the voltage at the output terminal VOUT of the light sensing sub-circuit 110 increases to the threshold voltage Vth1 of the first transistor T1, the first transistor T1 is turned on, a voltage of the control electrode of the second transistor T2 gradually decreases while the voltage at the output terminal VOUT of the light sensing sub-circuit 110 continues to increase, and the light sensing sub-circuit 110 outputs a second voltage pulse signal; when the voltage of the control electrode of the second transistor T2 is less than the threshold voltage Vth2 of the second transistor T2, the second transistor T2 is turned off, the voltage at the output terminal VOUT of the light sensing sub-circuit 110 gradually decreases under the action of the photocurrent of the second optical sensor 112, and the light sensing sub-circuit 110 outputs a third voltage pulse signal; and when the voltage at the output terminal VOUT of the light sensing sub-circuit 110 is less than the threshold voltage Vth1 of the first transistor T1, the first transistor T1 is turned off, the voltage of the control electrode of the second transistor T2 gradually increases under the action of the photocurrent of the first optical sensor 111, and the light sensing sub-circuit 110 outputs a fourth voltage pulse signal, until the voltage of the control electrode of the second transistor T2 increases to the threshold voltage Vth2 of the second transistor T2. Thereby, the light sensing sub-circuit 110 completes a duty cycle.

Figure 3:
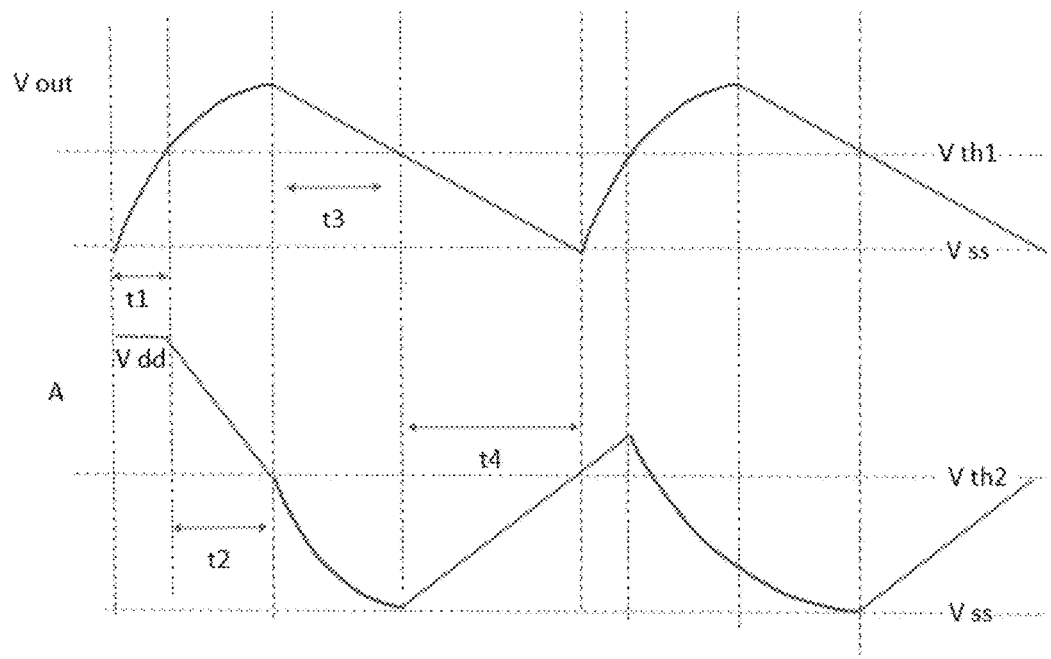
FIG. 3 is a timing diagram of an operation of the light sensing sub-circuit shown in FIG. 2.

Specifically, FIG. 3 is a timing diagram of an operation of the light sensing sub-circuit shown in FIG. 2. For convenience of the description of the operating process of the light sensing sub-circuit 110, a connection point between the control electrode of the second transistor T2 and the first capacitor C1 is denoted as point A, and in an initial state of the light sensing sub-circuit 110, the point A is at a high level (greater than the threshold voltage Vth2 of the second transistor T2.)

Figure 4A:
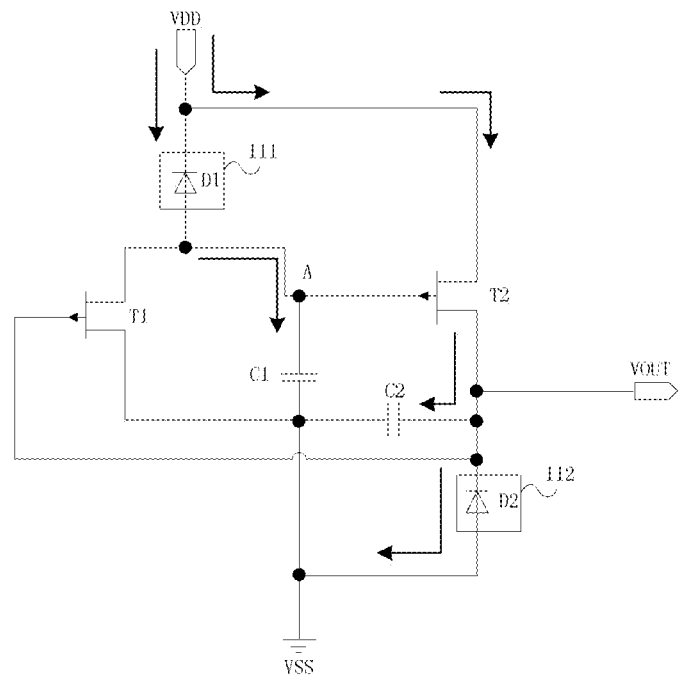
FIG. 4a is a diagram of a current flow of the light sensing sub-circuit shown in FIG. 2 during a time period t1.

When the point A is at a high level, the second transistor T2 is in a turn-on state, and a current flow of the light sensing sub-circuit 110 is shown in FIG. 4a. At this time, the first power source VDD charges the first capacitor C1 through the first light-sensitive diode D1 while the first power source VDD slowly charges the second capacitor C2 through the second transistor T2, and the voltage at the output terminal VOUT of the light sensing sub-circuit 110 gradually increases. When the voltage at the output terminal VOUT of the light sensing sub-circuit 110 gradually increases to the threshold voltage Vth1 of the first transistor T1, the first transistor T1 is turned on, and the light sensing sub-circuit 110 outputs a first voltage pulse signal, for example, Vout corresponding to a time period t1 in FIG. 3.

Figure 4B:
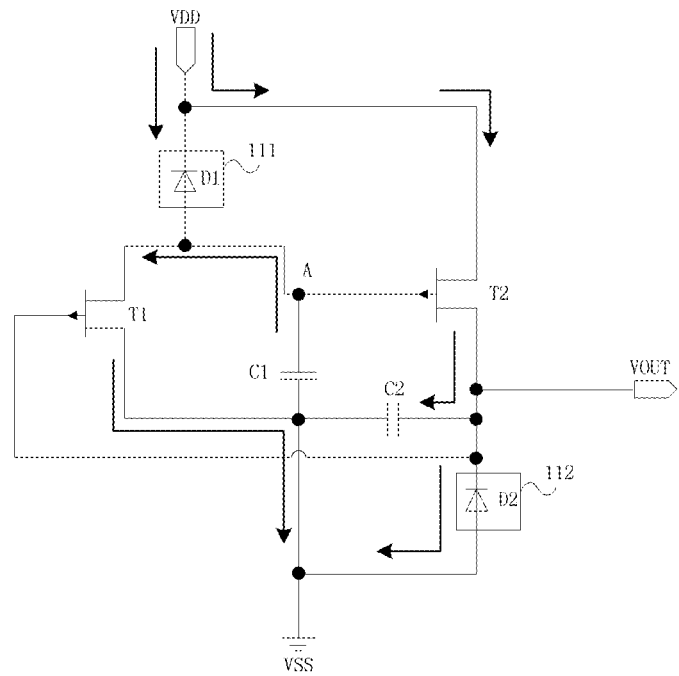
FIG. 4b is a diagram of a current flow of the light sensing sub-circuit shown in FIG. 2 during a time period t2.

When the first transistor T1 is in a turn-on state, the current flow of the light sensing sub-circuit 110 is shown in FIG. 4b. At this time, the first capacitor C1 is discharged through the first transistor T1, and the voltage at the point A gradually decreases. Since the voltage is not less than the threshold voltage Vth2 of the second transistor T2, the second transistor T2 is still in a turn-on state, the first power source VDD continues to slowly charge the second capacitor C2 through the second transistor T2, and the voltage at the output terminal VOUT of the light sensing sub-circuit 110 continues to increase until the voltage at the point A is less than or equal to the threshold voltage Vth2 of the second transistor T2. At this time, the second transistor T2 is turned off, the charging of the second capacitor C2 is stopped, and the light sensing sub-circuit 110 outputs a second voltage pulse signal, for example, Vout corresponding to a time period t2 in FIG. 3.

Figure 4C:
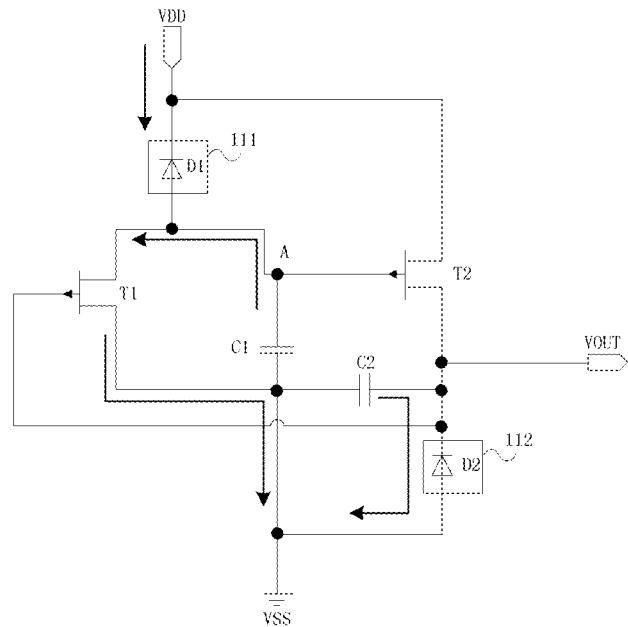
FIG. 4c is a diagram of a current flow of the light sensing sub-circuit shown in FIG. 2 during a time period t3.

After the second transistor T2 is turned off, the current flow of the light sensing sub-circuit 110 is shown in FIG. 4c. Due to the action of illumination, the second light-sensitive diode D2 may generate photocurrent. At this time, the second capacitor C2 is discharged through the second light-sensitive diode D2, and the voltage at the output terminal VOUT of the light sensing sub-circuit 110 gradually decreases while the voltage of the control electrode of the first transistor T1 gradually decreases. Before the voltage of the control electrode of the first transistor T1 is not less than the threshold voltage Vth1 of the first transistor T1, the first transistor T1 is always in a turn-on state, the first capacitor C1 continues to be discharged through the first transistor T1, and the voltage at the point A continues to decrease. When the voltage of the control electrode of the first transistor T1 is less than the threshold voltage Vth1 of the first transistor T1, the first transistor T1 is turned off, and the light sensing sub-circuit 110 outputs a third voltage pulse signal, for example, Vout corresponding to a time period t3 shown in FIG. 3.

Figure 4D:
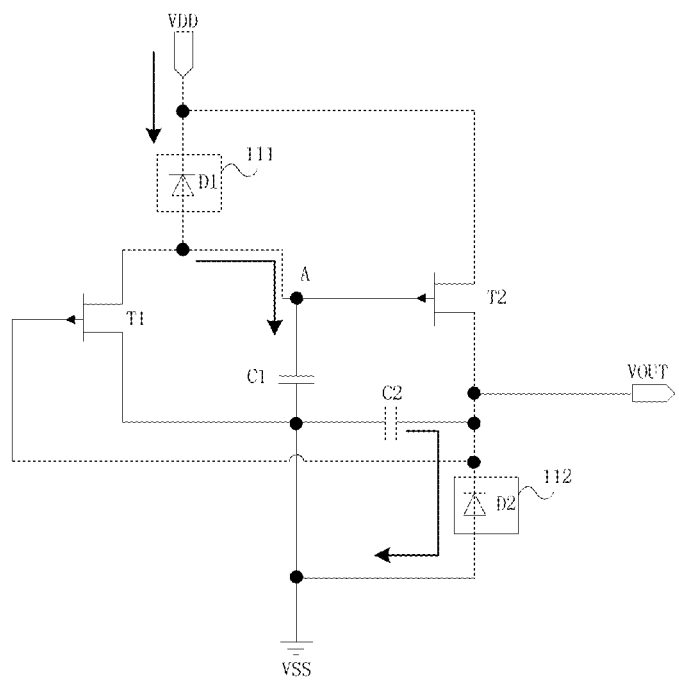
FIG. 4d is a diagram of a current flow of the light sensing sub-circuit shown in FIG. 2 during a time period t4.

After the first transistor T1 is turned off, the current flow of the light sensing sub-circuit 110 is shown in FIG. 4d. Under the action of illumination, the first light-sensitive diode D1 generates photocurrent, the first power source VDD charges the first capacitor C1, and the voltage at the point A gradually increases while the second capacitor C2 continues to be discharged through the second light-sensitive diode D2. When the voltage at the point A gradually increases to the threshold voltage Vth2 of the second transistor T2, the second transistor T2 is turned on, and the light sensing sub-circuit 110 outputs a fourth voltage pulse signal, for example, Vout corresponding to a time period t4 shown in FIG. 5. Until now, a duty cycle is formed, that is, the duty cycle of the light sensing sub-circuit 110 is T=t1+t2+t3+t4, then the light sensing sub-circuit 110 enters a next duty cycle, . . . , and the process is continuously repeated to output voltage pulse signals.

Values of t1, t2, t3, and t4 are derived below in conjunction with FIG. 3.

According to a calculation formula of charging and discharging time of a capacitor:

$$Vt = V0 + (Vu - V0) * [1 - \exp(-t/RC)] \quad (1)$$

where Vt is a voltage on the capacitor when the charging time period has reached a time period of t, V0 is an initial voltage on the capacitor when charging begins on the present charging condition, Vu is a final stable voltage if the present charging condition is maintained, and RC is a time constant.

As shown in FIG. 3, in the time period t1, the first power source VDD charges the capacitor C2 through the second transistor T2, the voltage of the capacitor C2 gradually increases from Vss to Vth1, and the voltage when the capacitor C2 is completely charged is Vdd. Therefore, the above parameters satisfy Vt=Vth1, Vu=Vdd and V0=Vss, R=a resistance R2 from the first electrode of the second transistor T2 to said one terminal of the second capacitor C2, $C=C2$, and $t=t1$. Then, these parameters are substituted into the above formula (1) to derive:

$$Vth1=Vss+(Vdd-Vss)*[1-\exp(-t1/R2*C2)] \quad (2)$$

After calculation through deformation of the formula (2), the time period t1 is finally obtained as:

$$t1=-(\log(1-(Vth1-Vss)/(Vdd-Vss)))*R2*C2 \quad (3)$$

In the time period t2, the first capacitor C1 is discharged through the first transistor T1, and the voltage of the first capacitor C1 gradually decreases from Vdd to Vth2, and finally decreases to Vss. Therefore, the above parameters satisfy $Vt=Vth2$, $Vu=Vss$ and $V0=Vdd$, R=a resistance R1 from said one terminal of the first capacitor C1 to the second electrode of the first transistor T1, $C=C1$, and $t=t2$. Then, these parameters are substituted into the above formula (1) to derive:

$$Vth2=Vdd+(Vss-Vdd)*[1-\exp(-t2/R1*C1)] \quad (4)$$

After calculation through deformation of the formula (4), the time period t2 is finally obtained as:

$$t2=-(\log(1-(Vdd-Vth2)/(Vdd-Vss)))*R1*C1 \quad (5)$$

In the time period t3, the second capacitor C2 is discharged through the second light-sensitive diode D2, and the voltage of the second capacitor C2 gradually decreases from Vdd to Vth1. At this time, the time period t3 is calculated according to formula $ic=C*(du/dt)$, where ic is discharging current of the capacitor, C is a capacitance value of the capacitor, and du/dt is a voltage change rate across the capacitor. Since in this time period, ic is photocurrent Idata2 generated by the second light-sensitive diode D2, du=Vdd−Vth1, dt=t3 and $C=C2$, t3 is finally calculated as (Vdd−Vth1)*C2/Idata2.

In the time period t4, the first power source VDD charges the first capacitor C1 through the first light-sensitive diode D1, and the voltage of the first capacitor C1 gradually increases from Vss to Vth2. At this time, time period t4 is calculated according to the formula $ic=C*(du/dt)$. Since in this time period, ic=photocurrent Idata1 generated by the first light-sensitive diode D1, du=Vth2−Vss, dt=t4 and $C=C1$, t4 is finally calculated as Vth2−Vss)*C1/Idata1.

It can be seen from the above analysis that during the complete duty cycle T, the time periods t1 and t2 are related to the time constant of the light sensing sub-circuit 110, which is a fixed value, the time period t3 is inversely proportional to the photocurrent Idata2, and the time period t4 is inversely proportional to the photocurrent Idata1. When the first light-sensitive diode D1 and the second light-sensitive diode D2 have the same model and characteristics, Idata1=Idata2. Therefore, when the duty cycle T or a frequency 1/T of the voltage pulse signal of the light sensing sub-circuit 110 is acquired, the photocurrent generated under the present intensity of the ambient light may be obtained through inverse calculation, and then the present intensity of the ambient light may be determined according to the photocurrent, thereby realizing the detection of the ambient light.

That is, the frequency 1/T of the voltage pulse signal is a reciprocal 1/(t1+t2+t3+t4) of a sum of the time periods of the first voltage pulse signal to the fourth voltage pulse signal, wherein the time period t3 of the third voltage pulse signal is inversely proportional to the photocurrent of the second optical sensor 112, and the time period t4 of the fourth voltage pulse signal is inversely proportional to the photocurrent of the first optical sensor 111. Since the photocurrent is positively proportional to the intensity of the ambient light, the higher the intensity of the ambient light, the less the duty cycle T, and the higher the corresponding frequency 1/T; and the lower the intensity of the ambient light, the greater the duty cycle T, and the lower the corresponding frequency 1/T.

In the above embodiments, the light sensing sub-circuit 110 realizes the detection of light according to the self-oscillation principle, and in the structure of the oscillation circuit, self-oscillation is realized under the interaction of the optical sensors, the transistors and the capacitors without externally applying a control signal, a voltage pulse signal related to the present intensity of the ambient light is output, and then the present intensity of the ambient light may be obtained according to a frequency of the voltage pulse signal through inverse calculation. The whole circuit has a simple structure and a small occupied area. In the embodiments of the present disclosure, the present intensity of the ambient light may be obtained using an oscillation circuit having another structure. However, the circuit shown in FIG. 2 has a simple structure and a small occupied area, and may be applied to a display array region of a display panel. Therefore, this circuit structure is preferably used, and structures of other circuits will not be described in detail here.

Further, according to some embodiments of the present disclosure, the first transistor T1 and the second transistor T2 are both N-type transistors. Since the light sensing sub-circuit 110 only uses N-type transistors (for example, N-type thin film transistors), the requirements for processes are lower than those of CMOS elements, which can effectively reduce the complexity of the fabrication process.

In addition, after the light sensing sub-circuit 110 shown in FIG. 2 is used to output a voltage pulse signal having a frequency related to the present intensity of the ambient light, how to quickly and efficiently acquire the frequency of the voltage pulse signal will be described in detail below.

Figure 5:
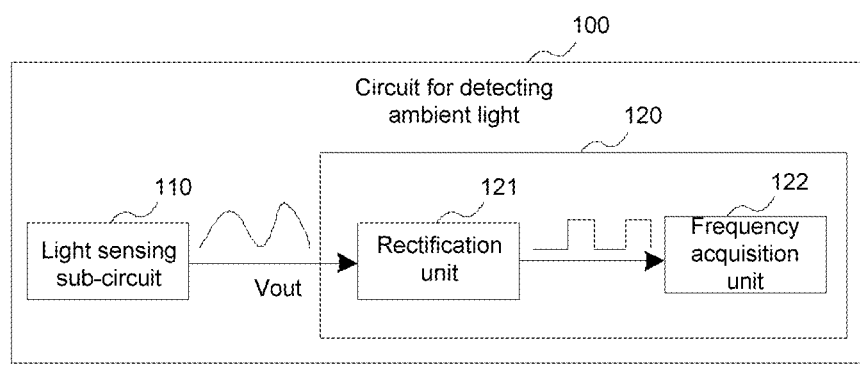
FIG. 5 is a block diagram of a circuit for detecting ambient light according to some embodiments of the present disclosure.

According to some embodiments of the present disclosure, as shown in FIG. 5, the detection sub-circuit 120 comprises a rectification unit 121 and a frequency acquisition unit 122. The rectification unit 121 is electrically connected to the light sensing sub-circuit 110, and is configured to rectify the voltage pulse signal to obtain a pulse wave having the same frequency and the same phase as those of the voltage pulse signal; and the frequency acquisition unit 122 is electrically connected to the rectification unit 121, and is configured to acquire the frequency of the pulse wave to determine the frequency of the voltage pulse signal.

Specifically, since the voltage signal output by the light sensing sub-circuit 110 is irregular, the voltage signal output by the light sensing sub-circuit 110 may firstly be rectified to form a pulse wave having the same frequency and the same phase as those of the voltage signal, then the frequency of the pulse wave is acquired by the frequency acquisition unit 122 to determine the frequency of the voltage signal, that is, the frequency of the voltage pulse signal output by the light sensing sub-circuit 110, and finally the present intensity of the ambient light may be obtained according to the frequency.

Further, in some embodiments of the present disclosure, the rectification unit 121 may be a trigger, and the frequency acquisition unit 122 may be a frequency discriminator. The frequency of the voltage pulse signal is obtained through the trigger and the frequency discriminator, which realizes a high response speed, can effectively shorten the time for frequency detection, and can improve the sensitivity of the circuit 100 for detecting ambient light to a certain extent, thereby improving the sensitivity of light adjustment of the display panel.

In summary, the circuit for detecting ambient light according to the embodiments of the present disclosure senses the present intensity of the ambient light through the light sensing sub-circuit to output a voltage pulse signal, and then acquires a frequency of the voltage pulse signal and obtains the present intensity of the ambient light according to the frequency of the voltage pulse signal through the detection sub-circuit. The circuit for detecting ambient light obtains the present intensity of the ambient light by acquiring the frequency of the voltage pulse signal corresponding to the present intensity of the ambient light. As a parameter to be detected is the frequency, advantages such as strong anti-interference ability and high detection accuracy are realized.

Figure 6:
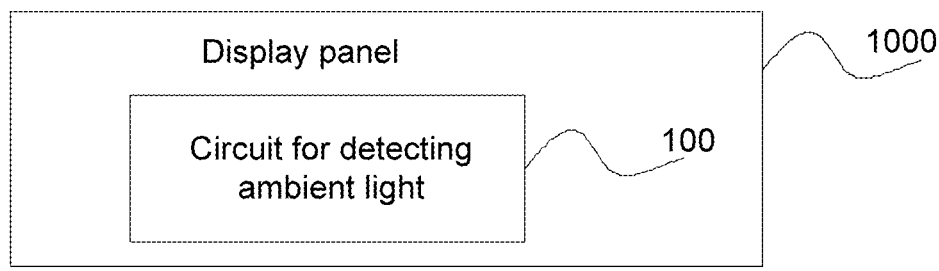
FIG. 6 is a block diagram of a display panel according to an embodiment of the present disclosure.

FIG. 6 is a block diagram of a display panel according to an embodiment of the present disclosure. As shown in FIG. 6, the display panel 1000 comprises the circuit 100 for detecting ambient light described above.

Figure 7:
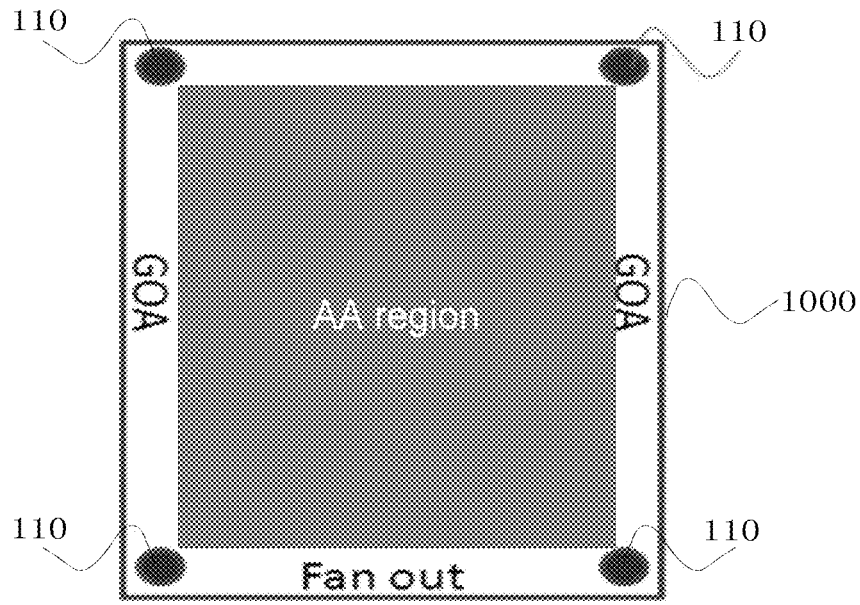
FIG. 7 is a diagram of a position of a light sensing sub-circuit on a display panel according to some embodiments of the present disclosure.

Specifically, as shown in FIG. 7, the light sensing sub-circuit 110 in the circuit 100 for detecting ambient light described above may be disposed at an edge of the display panel 1000 (where there is a large space). For example, the light sensing sub-circuit 110 may be disposed at the edge of the display panel 1000, and senses present intensity of the ambient light to output a voltage pulse signal having a frequency related to the present intensity of the ambient light, and then the detection unit 120 in the circuit 100 for detecting ambient light detects a frequency of the voltage pulse signal, calculates current photocurrent according to the frequency, and then acquires the present intensity of the ambient light according to the photocurrent through calculation or table look-up etc. If the ambient light has high intensity, transistors in an Active Area (AA) region (display array region) are controlled by a gate driving circuit in a Gate Driver On Array (GOA) region to increase brightness of a light-emitting diode, thereby automatically increasing the brightness of the display panel 1000; and if the ambient light has low intensity, the brightness of the display panel 1000 is automatically decreased by reducing the brightness of the light-emitting diode, thereby not only satisfying users' viewing requirements and achieving energy-saving purposes, but also enhancing the users' comfort.

In other embodiments of the present disclosure, four light sensing sub-circuits 110 may be simultaneously disposed at the edge of the display panel 1000 to improve the detection accuracy. In addition, the light sensing sub-circuit 110 shown in FIG. 2 may also be disposed in the display array region because of its characteristics such as a simple circuit structure and a small occupied area.

In addition, it should be illustrated that the circuit 100 for detecting ambient light described above is not only applicable to the field of display, but also to other fields which need to detect light, for example, automatic control of a street lamp, etc., which is not specifically limited here.

The display panel according to the embodiments of the present disclosure obtains the present intensity of the ambient light by acquiring the frequency of the voltage pulse signal corresponding to the present intensity of the ambient light through the circuit for detecting ambient light. As a parameter to be detected is the frequency, strong anti-interference ability and high detection accuracy are realized, which enables the brightness of the display panel to be more accurately adjusted.

Figure 8:
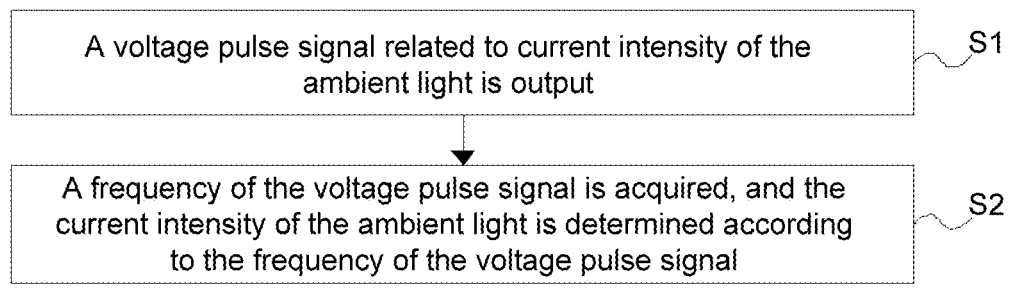
FIG. 8 is a flowchart of a method for detecting ambient light according to some embodiments of the present disclosure.

FIG. 8 is a flowchart of a method for detecting ambient light according to some embodiments of the present disclosure. As shown in FIG. 8, the method for detecting ambient light comprises the following steps.

In S1, a voltage pulse signal related to present intensity of the ambient light is output.

In S2, a frequency of the voltage pulse signal is acquired, and the present intensity of the ambient light is obtained according to the frequency of the voltage pulse signal.

According to some embodiments of the present disclosure, acquiring the frequency of the voltage pulse signal comprises: rectifying the voltage pulse signal to obtain a pulse wave having the same frequency and the same phase as those of the voltage pulse signal; and acquiring the frequency of the pulse wave, and determining the frequency of the voltage pulse signal according to the frequency of the pulse wave.

It should be illustrated that, details not disclosed in the method for detecting ambient light according to the embodiments of the present disclosure can be known with reference to the details disclosed in the circuit for detecting ambient light according to the embodiments of the present disclosure, and are not described in detail here.

The method for detecting ambient light according to the embodiments of the present disclosure firstly senses present intensity of the ambient light to output a voltage pulse signal, then acquires a frequency of the voltage pulse signal, and obtains the present intensity of the ambient light according to the frequency of the voltage pulse signal. This method obtains the present intensity of the ambient light by acquiring the frequency of the voltage pulse signal corresponding to the present intensity of the ambient light. As a parameter to be detected is the frequency, advantages such as strong anti-interference ability and high detection accuracy are realized.

In the description of the present disclosure, it is to be understood that orientation or positional relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", "counterclockwise", "axial", "radial", "circumferential" etc. are based on the orientation or positional relationships shown in the accompanying drawings, and are merely for the convenience of describing the present disclosure and simplifying the description, but do not indicate or suggest that the indicated apparatus or element must have a particular orientation, or must be constructed and operated in a particular orientation, and therefore should not be construed as limiting the present disclosure.

Furthermore, the terms "first" and "second" are used for descriptive purposes only, and are not to be construed as indicating or implying relative importance or implicitly indicating a number of indicated technical features. Thus, features defined by "first" and "second" may explicitly or implicitly indicate that the second power source includes least one of the features. In the description of the present disclosure, "plurality" means at least two, such as two, three, etc., unless explicitly and specifically defined otherwise.

In the present disclosure, the terms "install," "connect with," "connect to," "fix," etc. shall be understood in a broad sense unless specifically defined or stipulated otherwise. For example, they may be fixed connections, or detachable connections, or integral connections; or may be mechanical connections or electrical connections; or may be direct connections, or indirect connections through an intermediary; or may be internal connections between two elements or interactions between two elements, unless explicitly defined otherwise. Those of ordinary skill in the art can understand the specific meanings of the above terms in the present disclosure according to specific conditions.

In the present disclosure, unless specifically stipulated and defined otherwise, the first feature "above" or "below" the second feature may be that the first feature and the second feature are in direct contact, or that the first feature and the second feature are in indirect contact via an intermediary. Further, the first feature "above", "on" and "on top of" the second feature may be that the first feature is directly above or diagonally above the second feature, or may simply indicate that the first feature is higher than the second feature in height. The first feature "under", "below" and "beneath" the second feature may be that the first feature is directly below or diagonally below the second feature, or may simply indicate that the first feature is lower than the second feature.

In the description of the present specification, the description referring to the terms "certain embodiments", "some embodiments", "an example", "a specific example", or "some examples" etc. means that a specific feature, structure, material or characteristics described in conjunction with the embodiment or example is included in at least some embodiments or examples of the present disclosure. In the present specification, schematic expressions of the above terms do not necessarily have to refer to the same embodiment or example. Furthermore, the specific feature, structure, material, or characteristics described may be combined in any suitable manner in any one or more embodiments or examples. In addition, those skilled in the art can combine and merge different embodiments or examples described in the present specification and features in different embodiments or examples without conflicting with each other.

Although the embodiments of the present disclosure have been shown and described above, it can be understood that the above embodiments are exemplary and are not to be construed as limiting the present disclosure. Those of ordinary skill in the art can make changes, modifications, substitutions and variations to the above embodiments within the scope of the present disclosure.

We claim:

1. A circuit for detecting ambient light, comprising:
   a light sensing sub-circuit configured to output a voltage pulse signal related to present intensity of the ambient light; and
   a detection sub-circuit electrically connected to the light sensing sub-circuit, and configured to acquire a frequency of the voltage pulse signal, and obtain the present intensity of the ambient light according to the frequency of the voltage pulse signal;
   wherein the light sensing sub-circuit comprises:
      a first optical sensor, a first terminal of the first optical sensor being electrically connected to a first power source;
      a first transistor, a first electrode of the first transistor being electrically connected to a second terminal of the first optical sensor;
      a second transistor, a first electrode of the second transistor being electrically connected to the first power source, a control electrode of the second transistor being electrically connected to the first electrode of the first transistor, and a second electrode of the second transistor being electrically connected to an output terminal of the light sensing sub-circuit;
      a first capacitor and a second capacitor, wherein a first terminal of the first capacitor is electrically connected to the control electrode of the second transistor, a first terminal of the second capacitor is electrically connected to the second electrode of the second transistor, and a second terminal of the first capacitor, a second terminal of the second capacitor and a second electrode of the first transistor are electrically connected to a second power source, respectively; and
      a second optical sensor, a first terminal of the second optical sensor being electrically connected to the second electrode of the second transistor, the first terminal of the second capacitor, and a control electrode of the first transistor respectively, and a second terminal of the second optical sensor being electrically connected to the second power source.

2. The circuit according to claim 1, wherein the first optical sensor comprises a first light-sensitive diode, and the second optical sensor comprises a second light-sensitive diode, wherein:
   a cathode of the first light-sensitive diode is electrically connected to the first power source, and an anode of the first light-sensitive diode is electrically connected to the first electrode of the first transistor, and
   a cathode of the second light-sensitive diode is electrically connected to the second electrode of the second transistor, the first terminal of the second capacitor, and the control electrode of the first transistor respectively, and an anode of the second light-sensitive diode is connected to the second power source, and both the first light-sensitive diode and the second light-sensitive diode operate in a reverse bias state.

3. The circuit according to claim 1, wherein a voltage of the first power source is greater than a threshold voltage of the first transistor and greater than a threshold voltage of the second transistor, and a voltage of the second power source is less than the threshold voltage of the first transistor and less than the threshold voltage of the second transistor.

4. The circuit according to claim 1, wherein the detection sub-circuit comprises:
   a rectification unit electrically connected to the light sensing sub-circuit, and configured to rectify the voltage pulse signal to obtain a pulse wave having the same frequency and the same phase as those of the voltage pulse signal; and
   a frequency acquisition unit electrically connected to the rectification unit, and configured to acquire the frequency of the pulse wave, and determine the frequency of the voltage pulse signal according to the frequency of the pulse wave.

5. The circuit according to claim 4, wherein the rectification unit comprises a trigger, and the frequency acquisition unit comprises a frequency discriminator.

6. The circuit according to claim 1, wherein the first transistor and the second transistor are both N-type transistors.

7. A display panel, comprising the circuit according to claim 1.

8. A method for detecting ambient light by using the circuit according to claim 1, comprising steps of:
   outputting, by the light sensing sub-circuit, a voltage pulse signal related to present intensity of the ambient light; and
   acquiring, by the detection sub-circuit, a frequency of the voltage pulse signal, and obtaining the present intensity of the ambient light according to the frequency of the voltage pulse signal.

9. The method according to claim 8, wherein the step of acquiring the frequency of the voltage pulse signal comprises:
rectifying the voltage pulse signal to obtain a pulse wave having the same frequency and the same phase as those of the voltage pulse signal; and
acquiring the frequency of the pulse wave, and determining the frequency of the voltage pulse signal according to the frequency of the pulse wave.

10. The circuit according to claim 2, wherein the detection sub-circuit comprises:
a rectification unit electrically connected to the light sensing sub-circuit, and configured to rectify the voltage pulse signal to obtain a pulse wave having the same frequency and the same phase as those of the voltage pulse signal; and
a frequency acquisition unit electrically connected to the rectification unit, and configured to acquire the frequency of the pulse wave, and determine the frequency of the voltage pulse signal according to the frequency of the pulse wave.

11. The circuit according to claim 3, wherein the detection sub-circuit comprises:
a rectification unit electrically connected to the light sensing sub-circuit, and configured to rectify the voltage pulse signal to obtain a pulse wave having the same frequency and the same phase as those of the voltage pulse signal; and
a frequency acquisition unit electrically connected to the rectification unit, and configured to acquire the frequency of the pulse wave, and determine the frequency of the voltage pulse signal according to the frequency of the pulse wave.

\* \* \* \* \*